United States Patent
Nakano et al.

(10) Patent No.: US 11,144,028 B2
(45) Date of Patent: Oct. 12, 2021

(54) COMMUNICATION DEVICE, CONTROL METHOD OF COMMUNICATION DEVICE, EXTERNAL DEVICE, CONTROL METHOD OF EXTERNAL DEVICE, AND CONTROL SYSTEM

(71) Applicant: OMRON Corporation, Kyoto (JP)

(72) Inventors: Yoshimitsu Nakano, Kyoto (JP); Hidekatsu Nogami, Kyoto (JP); Yahiro Koezuka, Kyoto (JP); Arata Kataoka, Kyoto (JP)

(73) Assignee: OMRON Corporation, Kyoto (JP)

( * ) Notice: Subject to any disclaimer, the term of this patent is extended or adjusted under 35 U.S.C. 154(b) by 31 days.

(21) Appl. No.: 16/351,525

(22) Filed: Mar. 13, 2019

(65) Prior Publication Data

US 2019/0332081 A1    Oct. 31, 2019

(30) Foreign Application Priority Data

Apr. 25, 2018    (JP) .............................. JP2018-084107

(51) Int. Cl.
*G05B 19/05*    (2006.01)
*G05B 13/02*    (2006.01)
*H04L 29/08*    (2006.01)

(52) U.S. Cl.
CPC ......... *G05B 19/05* (2013.01); *G05B 13/0265* (2013.01); *H04L 67/125* (2013.01);
(Continued)

(58) Field of Classification Search
CPC ................ G05B 19/05; G05B 13/0265; G05B 2219/1101; G05B 2219/1133; G05B 2219/1181; G05B 19/406; G05B 2219/37494; G05B 2219/37499; G05B 2219/37514; G05B 15/02; H04L 67/125; H04L 43/02; B25J 9/1676; G01M 99/00; G01D 21/00; H04W 4/38
See application file for complete search history.

(56) References Cited

U.S. PATENT DOCUMENTS

2005/0264251 A1    12/2005    Bischoff et al.
2015/0246442 A1*    9/2015    Cho ...................... B25J 19/021
                                                            700/253
2016/0226513 A1    8/2016    Liaghati

FOREIGN PATENT DOCUMENTS

CN    1723623    1/2006
CN    103118097    5/2013
(Continued)

OTHER PUBLICATIONS

"Search Report of Europe Counterpart Application", dated Sep. 20, 2019, pp. 1-15.

(Continued)

Primary Examiner — Tejal Gami
(74) Attorney, Agent, or Firm — JCIPRNET

(57) ABSTRACT

The disclosure is provided to transmit a sensor value from a sensor to an external device with high efficiency. A sensor value of a sensor is acquired, basic data as time-series data is generated with reference to the acquired sensor value, differential data indicating a difference between the basic data and measurement data as time-series data corresponding to the sensor value acquired from the sensor is generated, and the differential data is transmitted to an external device through wireless communication.

18 Claims, 14 Drawing Sheets

(52) U.S. Cl.
CPC ............ *G05B 2219/1101* (2013.01); *G05B 2219/1133* (2013.01); *G05B 2219/1181* (2013.01)

(56) References Cited

FOREIGN PATENT DOCUMENTS

| | | |
|---|---|---|
| CN | 104875209 | 9/2015 |
| CN | 106549672 | 3/2017 |
| DE | 10258472 | 5/2004 |
| EP | 1731980 | 12/2006 |
| EP | 3285126 | 2/2018 |
| JP | 2000241459 | 9/2000 |
| JP | 2001241975 | 9/2001 |

OTHER PUBLICATIONS

Yann-Aël Le Borgne et al., "Adaptive model selection for time series prediction in wireless sensor networks," Signal Processing, vol. 87, No. 12, Dec. 2007, pp. 3010-3020.

M. A. Razzaque et al., "Compression in wireless sensor networks: a survey and comparative evaluation," ACM Transactions on Sensor Networks, vol. 10, No. 1, Article 5, Nov. 2013, pp. 1-44.

"Office Action of China Counterpart Application", dated Oct. 23, 2020, with English translation thereof, p. 1-p. 20.

\* cited by examiner

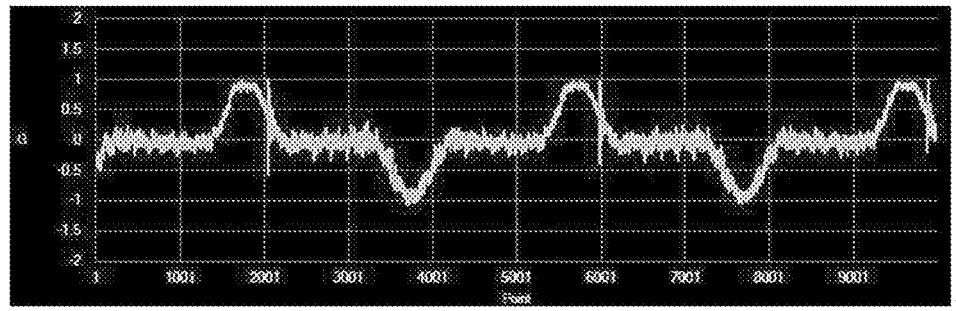
FIG. 3(a)
| Pattern | Number of samples | Waveform data |
|---|---|---|
| Operation A | 1024 | -0.05784, 0.00552, -0.03102, -0.08442, 0.03312 ··· |
| Operation B | 512 | 0.91818, 0.92076, 0.9015, 0.9135, 0.92934 ··· |
| Operation C | 1024 | -0.84036, -0.73794, -0.74094, -0.77562, -0.65094 ··· |
FIG. 3(b)
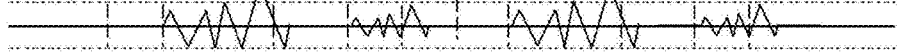
FIG. 4

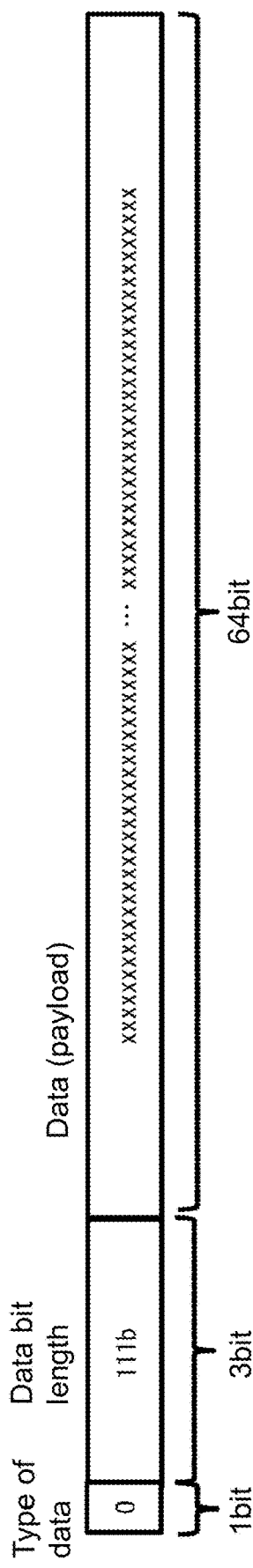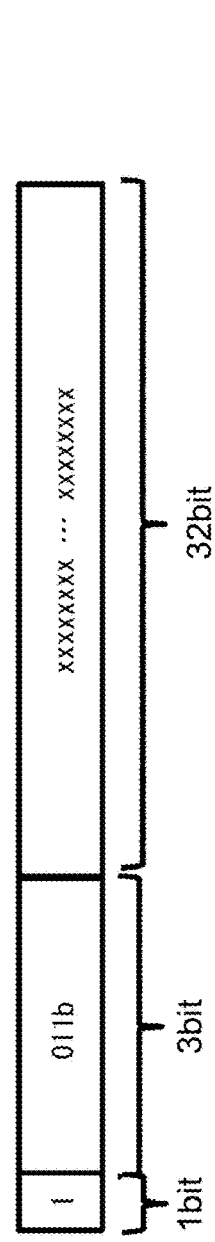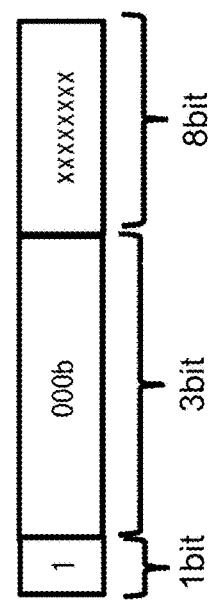
FIG. 5(a)
FIG. 5(b)
FIG. 5(c)

COMMUNICATION DEVICE, CONTROL METHOD OF COMMUNICATION DEVICE, EXTERNAL DEVICE, CONTROL METHOD OF EXTERNAL DEVICE, AND CONTROL SYSTEM

CROSS-REFERENCE TO RELATED APPLICATION

This application claims the priority benefit of Japan Application No. 2018-084107, filed on Apr. 25, 2018. The entirety of the above-mentioned patent application is hereby incorporated by reference herein and made a part of this specification.

BACKGROUND

Technical Field

The disclosure relates to a communication device configured to process data based on a sensor signal, a control method of a communication device, an external device, a control method of an external device, and a control system.

Description of Related Art

In the related art, a technology in which a sensor is retrofitted to a measurement target machine such as a robot or a processing machine, and a sensor value from the sensor is collected and analyzed to detect a sign of a failure of the measurement target machine is known. Communication between the sensor and a collection device configured to collect data from the sensor may be performed in a wired manner or wireless manner.

When communication is performed in a wired manner, a communication speed is high, but a wiring may be obstructive depending on an operation of the robot. Therefore, communication is preferably performed in a wireless manner.

PATENT DOCUMENTS

[Patent Document 1] Japanese Laid-open No. 2001-241975 (published Sep. 7, 2001)
[Patent Document 2] Japanese Laid-open No. 2000-241459 (published Sep. 9, 2000)

However, in the case of wireless communication, a communication speed is, for example, 100 kbps in communication using a 920 Mhz band, and about 250 kbps in communication using a 2.5 GHz band, and the communication band is relatively narrow. Therefore, in the case of wireless communication, an operation of reducing a resolution of the sensor and thus reducing of an amount of data is performed. That is, it is difficult to meet the need to collect a sensor value with high accuracy.

Here, Patent Document 1 discloses a technology in which a difference between a measurement value of a sensor and a previous measurement value of the sensor is recorded and thus a recording volume is reduced. However, the measurement value changes greatly, for example, by fluctuating up and down, and a difference between a measurement value of the sensor and a previous measurement value of the sensor increases, and as result, an amount of data increases.

In addition, as described in Patent Document 1, when a difference between a measurement value of the sensor and a previous measurement value of the sensor is recorded, if it is not possible to acquire data continuously, it is not possible to restore the original sensor value. Since a communication state is unstable in wireless communication compared to wired communication, when the sensor value is transmitted and received, acquisition of data may be skipped and there is a possibility of data not being acquired continuously.

In addition, in Patent Document 2, a configuration in which an input waveform is compared with preset reference waveform data in order to detect a waveform abnormality of a repeating waveform is disclosed. However, an abnormal waveform may be detected and a target waveform may be limited to the repeating waveform. Therefore, it is not possible to apply the configuration for abnormality detection of a value of which the change randomly fluctuates up and down, such as a sensor value of the sensor.

An aspect of the disclosure provides a technology for transmitting a sensor value from a sensor with a sufficient amount of information to an external device with high efficiency even in a wireless communication with a narrow communication band.

SUMMARY

A communication device according to an aspect of the disclosure is a communication device that transmits a sensor value of a sensor, which is configured to measure a predetermined physical quantity when a measurement target machine operates, to an external device through wireless communication, the communication device including a sensor value acquisition part configured to acquire the sensor value, a basic data generating part configured to generate basic data as time-series data with reference to the acquired sensor value, a differential data generating part configured to generate differential data indicating a difference between the basic data and measurement data as time-series data corresponding to the sensor value acquired from the sensor, and a communication part configured to transmit the differential data to the external device.

In addition, a control method of a communication device according to an aspect of the disclosure is a control method of a communication device that transmits a sensor value of a sensor configured to measure a predetermined physical quantity when a measurement target machine operates to an external device through wireless communication, the control method including a learning phase in which the sensor value is acquired and basic data as time-series data is generated by learning and referring to the sensor value and including an operation phase in which differential data indicating a difference between the basic data and measurement data as time-series data corresponding to the sensor value acquired when the measurement target machine operates from the sensor is generated, and the differential data is transmitted to the external device.

In addition, an external device according to an aspect of the disclosure includes a reception part configured to receive the basic data and the differential data from the communication device and a reconstruction part configured to reconstruct the sensor value based on the basic data and the differential data.

In addition, a control method of an external device according to an aspect of the disclosure includes a basic data reception step of receiving the basic data from the communication device and a reconstruction step of receiving the differential data and reconstructing the sensor value based on the basic data and the differential data.

In addition, a control system according to an aspect of the disclosure includes the communication device and the external device.

BRIEF DESCRIPTION OF THE DRAWINGS

FIGS. 3(a) and 3(b) are diagrams showing an example of basic data.

(a) of FIG. 4 shows a basic waveform of basic data, (b) of FIG. 4 shows a measurement waveform of measurement data, and (c) of FIG. 4 is a diagram showing differential data.

FIGS. 5(a) to 5(c) are diagrams showing examples of differential data.

Figure 6:
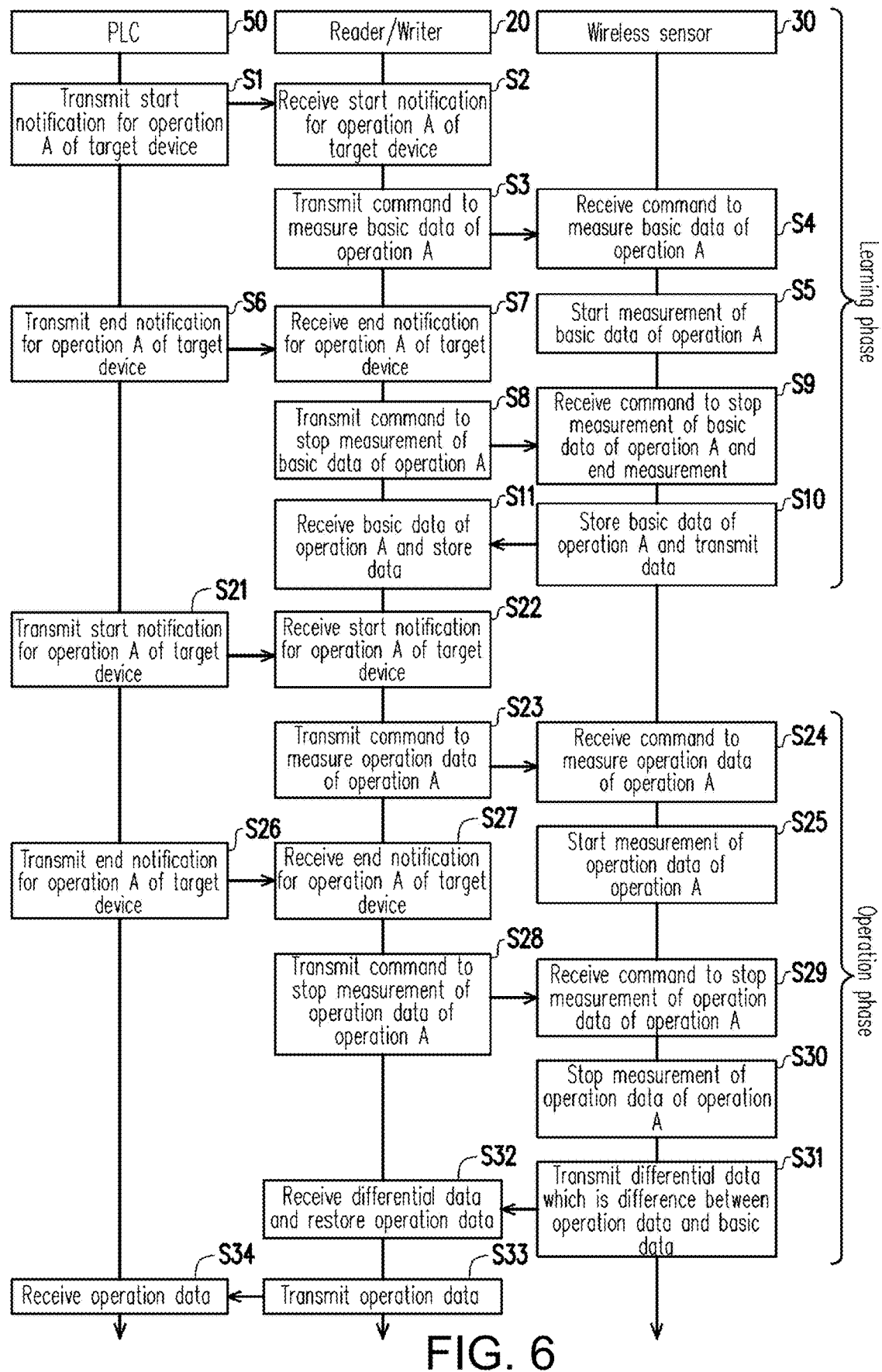

FIG. 6 is a sequence diagram showing a flow of a process performed among a programmable logic controller (PLC), a reader/writer, and a communication device.

Figure 7:
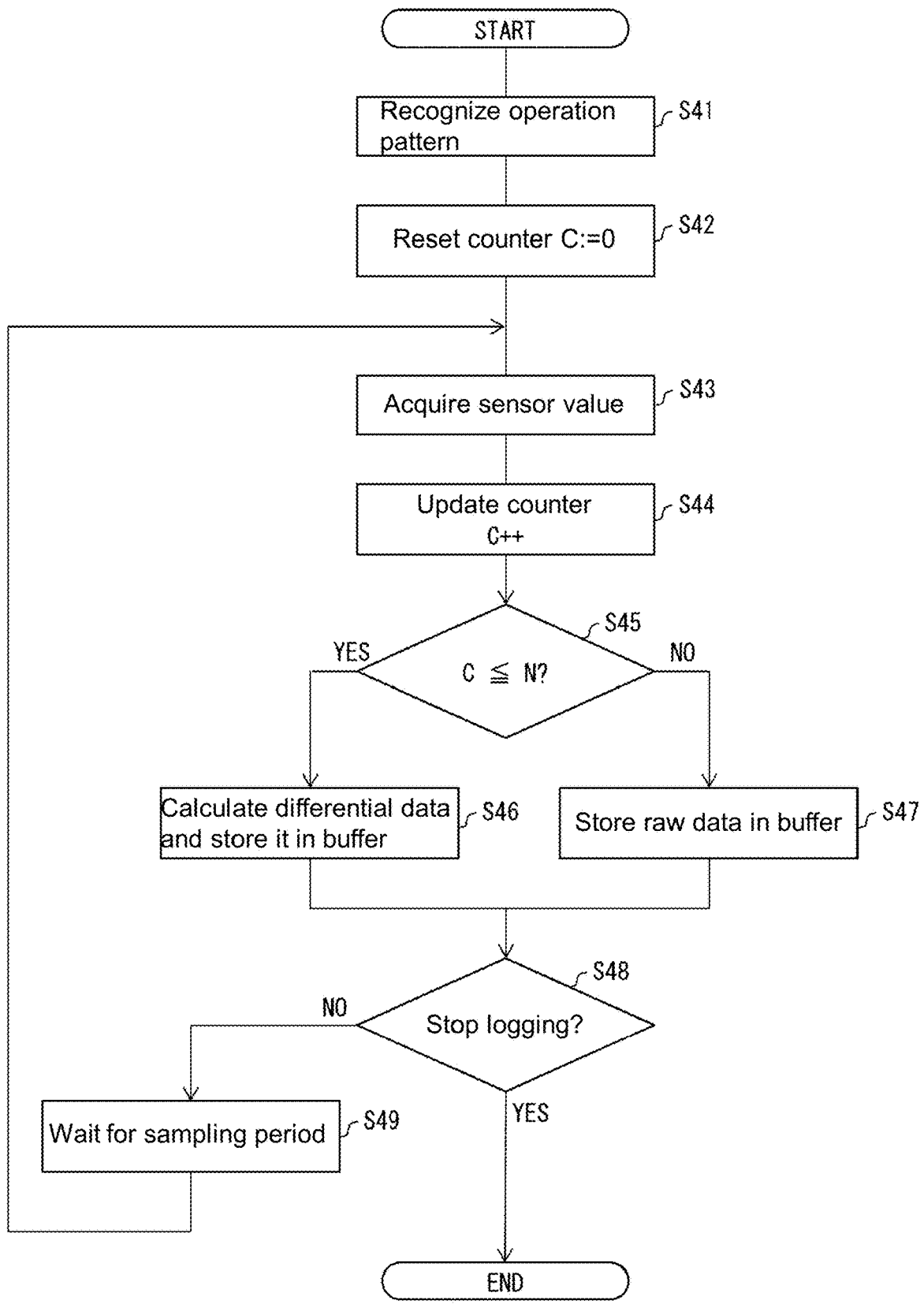

FIG. 7 is a flowchart showing a flow of a process performed by the communication device.

Figure 8:
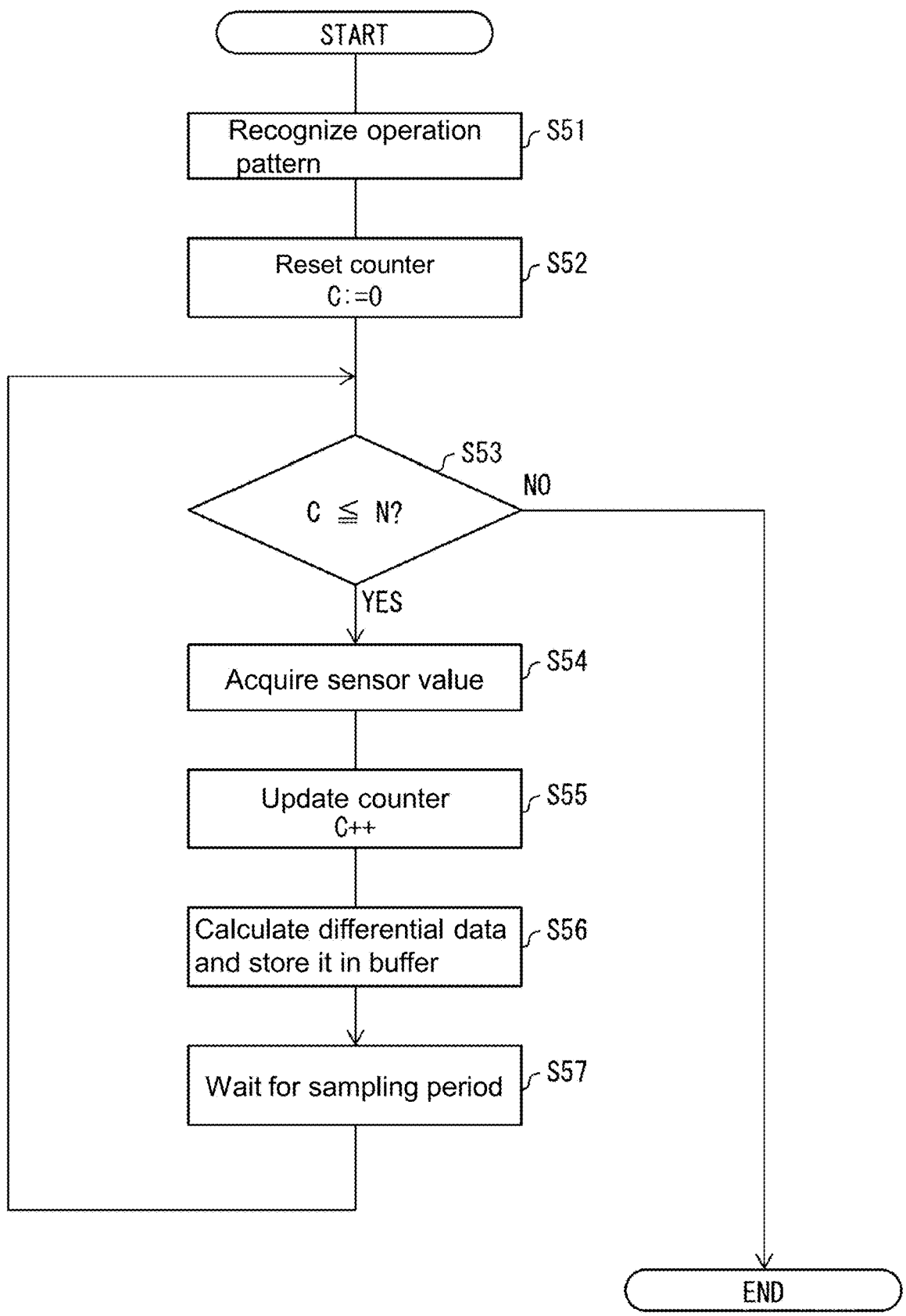

FIG. 8 is a flowchart showing a flow of a process performed by the communication device.

Figure 9A:
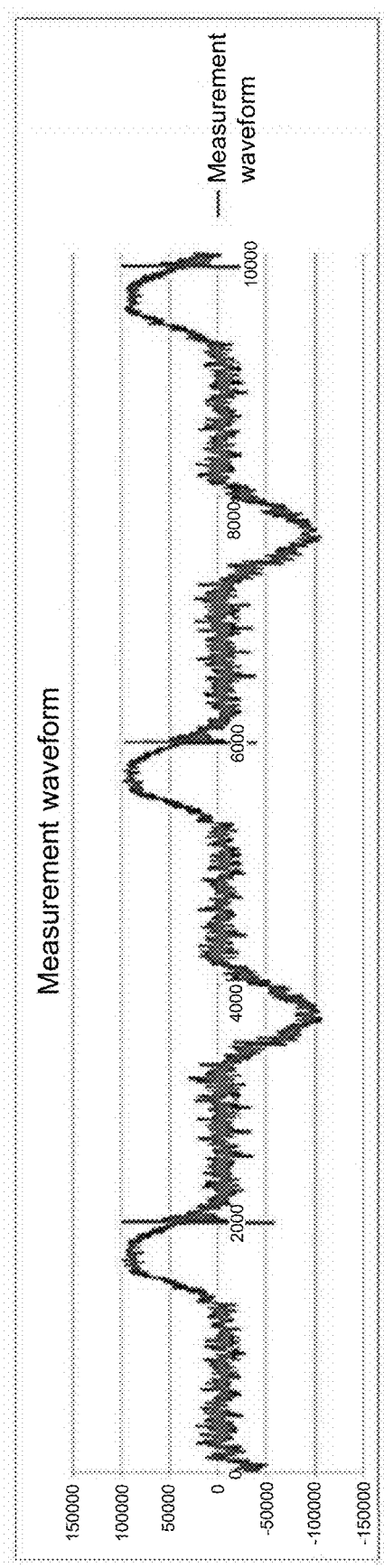
Figure 9B:
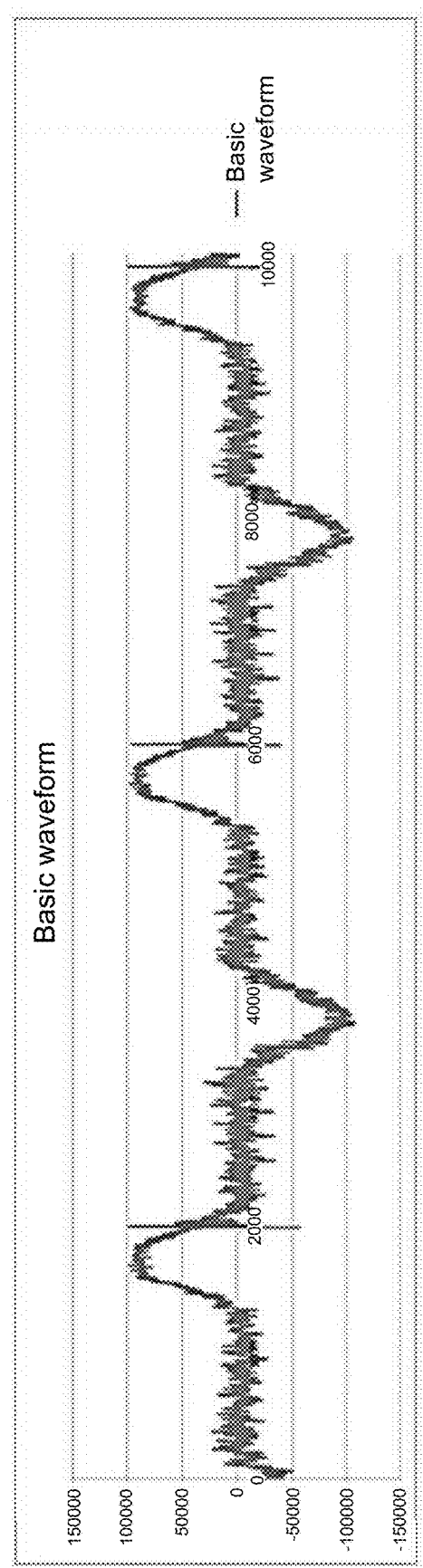
Figure 9C:
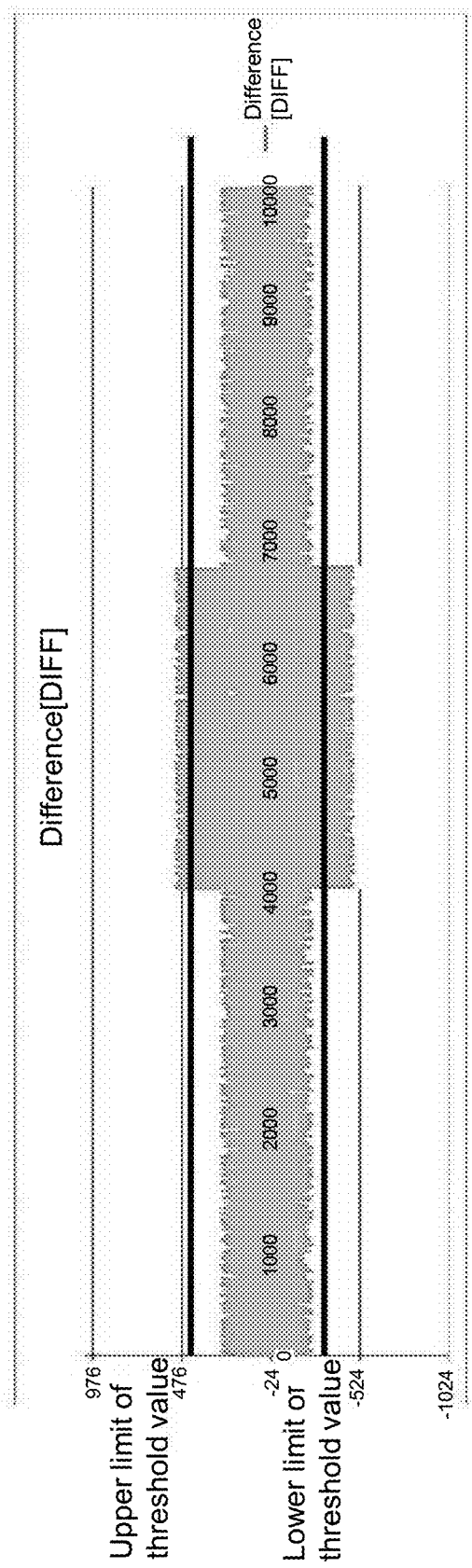

FIG. 9(a) shows a measurement waveform, FIG. 9(b) shows a basic waveform, and FIG. 9(c) is a diagram showing a difference between a measurement waveform and a basic waveform.

Figure 10:
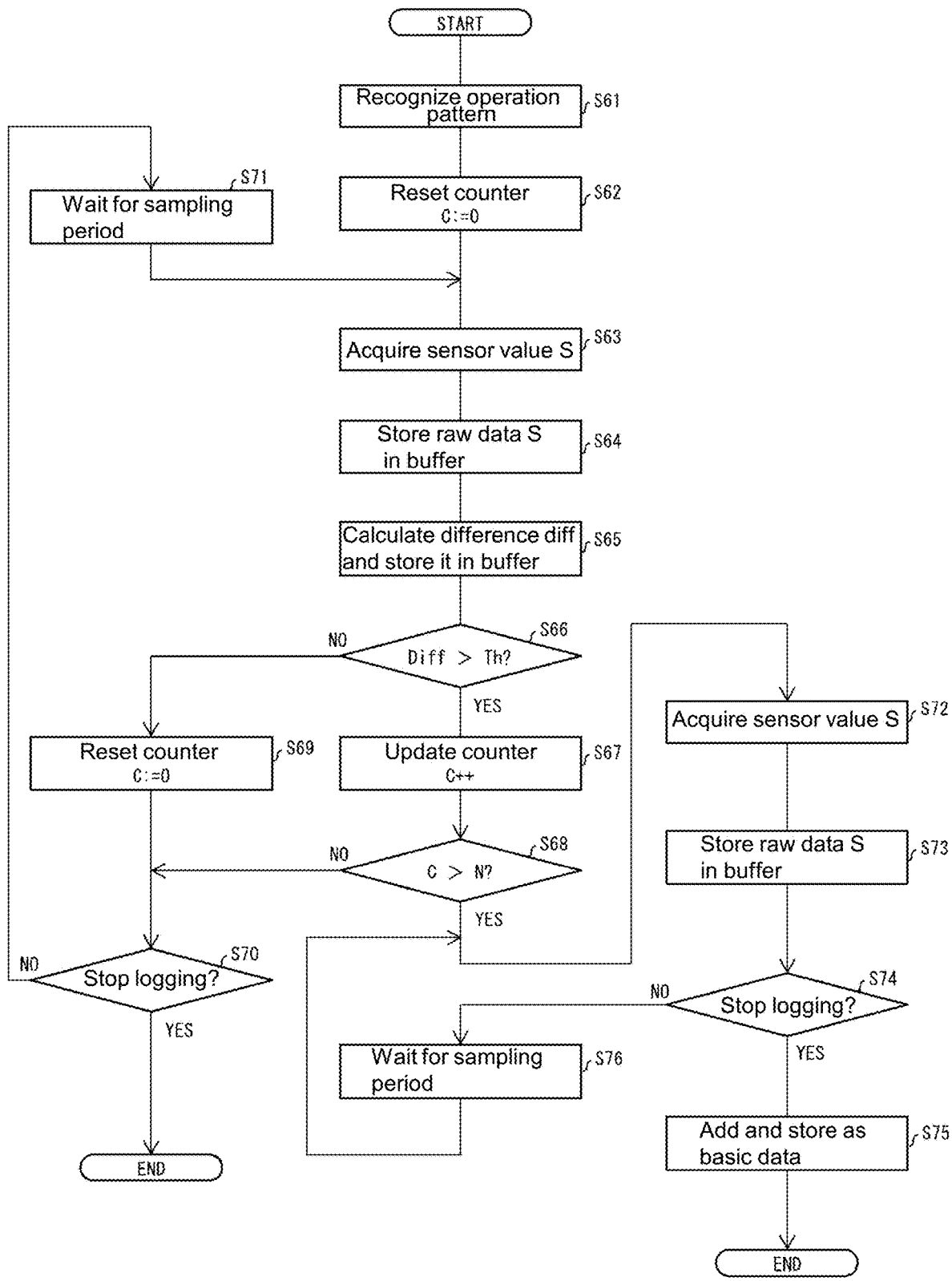

FIG. 10 is a flowchart showing a flow of a process performed by the communication device.

Figure 11:
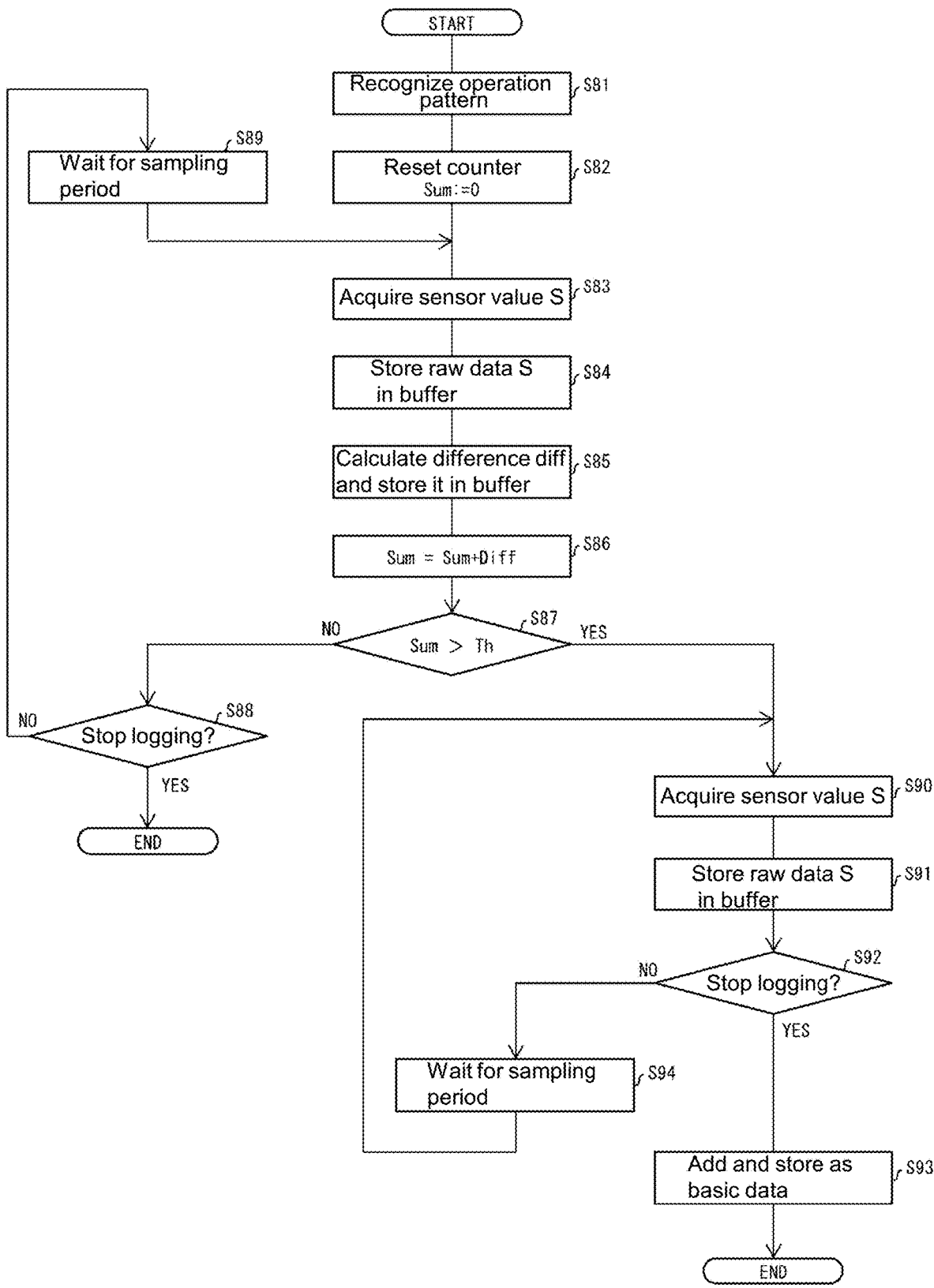

FIG. 11 is a flowchart showing a flow of a process performed by the communication device.

Figure 12:
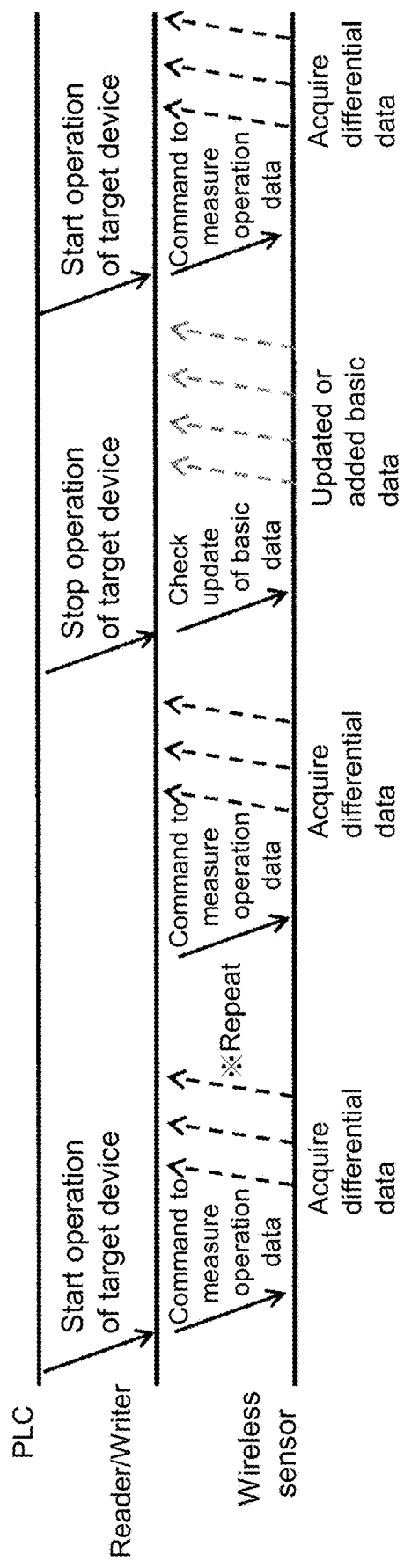

FIG. 12 is a diagram showing timings at which the communication device transmits basic data to the reader/writer.

Figure 13:
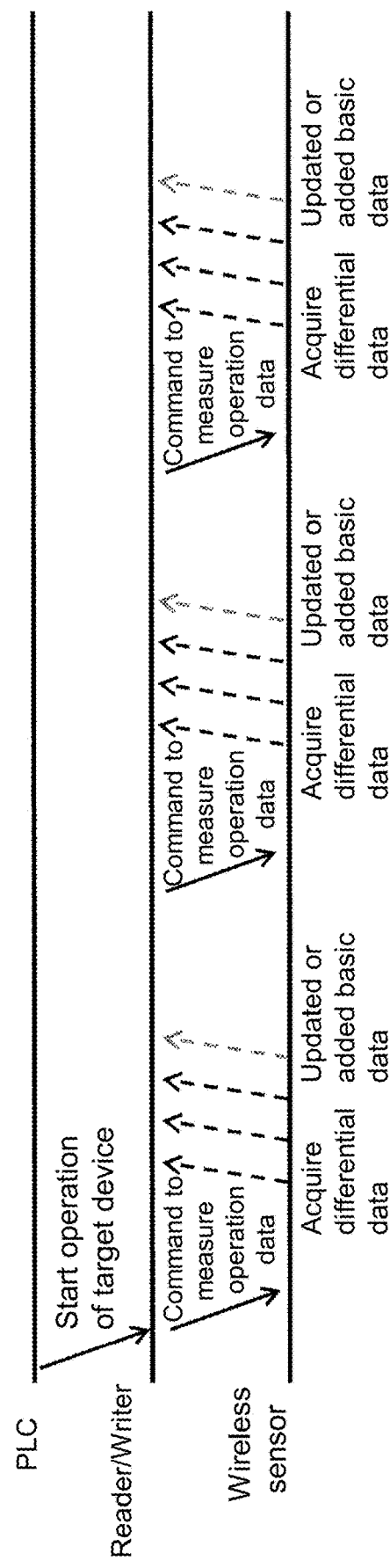

FIG. 13 is a diagram showing timings at which the communication device transmits basic data to the reader/writer.

Figure 14:
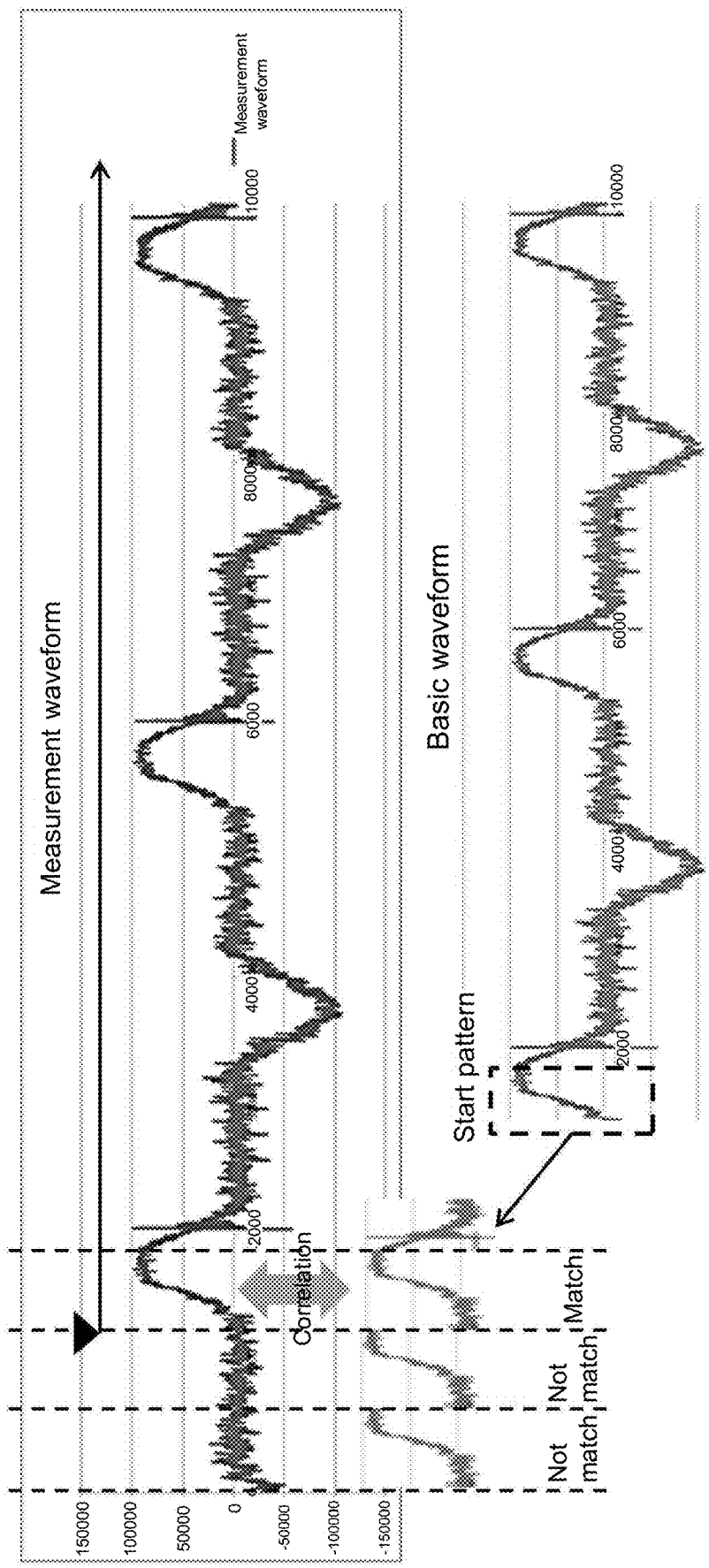

FIG. 14 is a diagram showing a correlation between a basic waveform of basic data and a measurement waveform of measurement data.

DESCRIPTION OF THE EMBODIMENTS

An embodiment according to an aspect of the disclosure (hereinafter referred to as "the present embodiment") will be described below with reference to the drawings.

§ 1 Application Example

Figure 1:
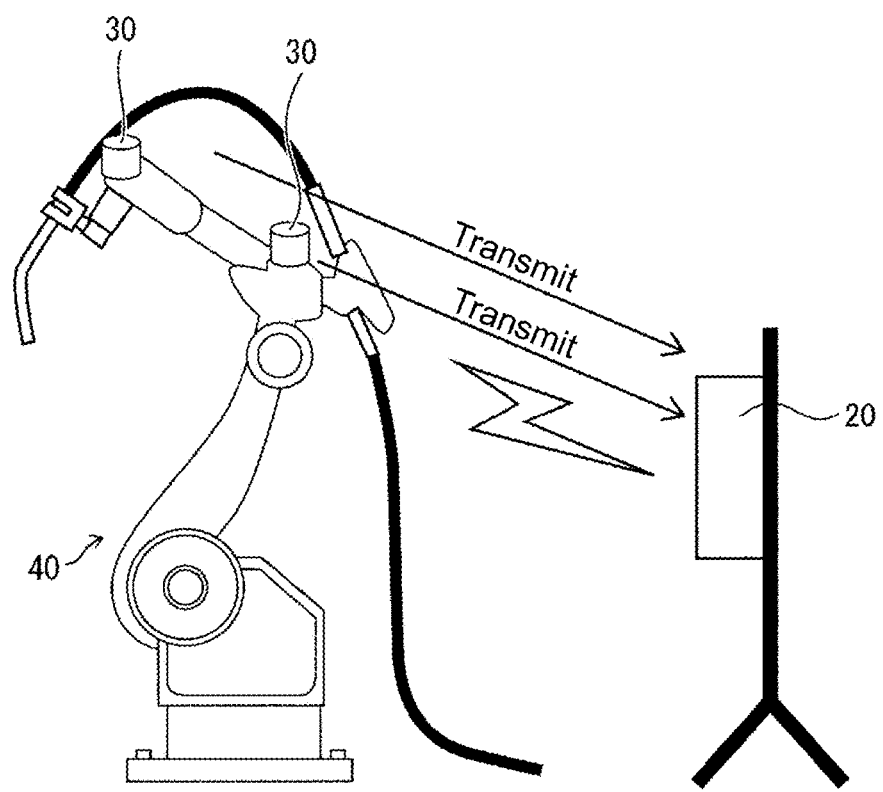
FIG. 1 is a diagram schematically showing a schematic configuration of a control system.
Figure 2:
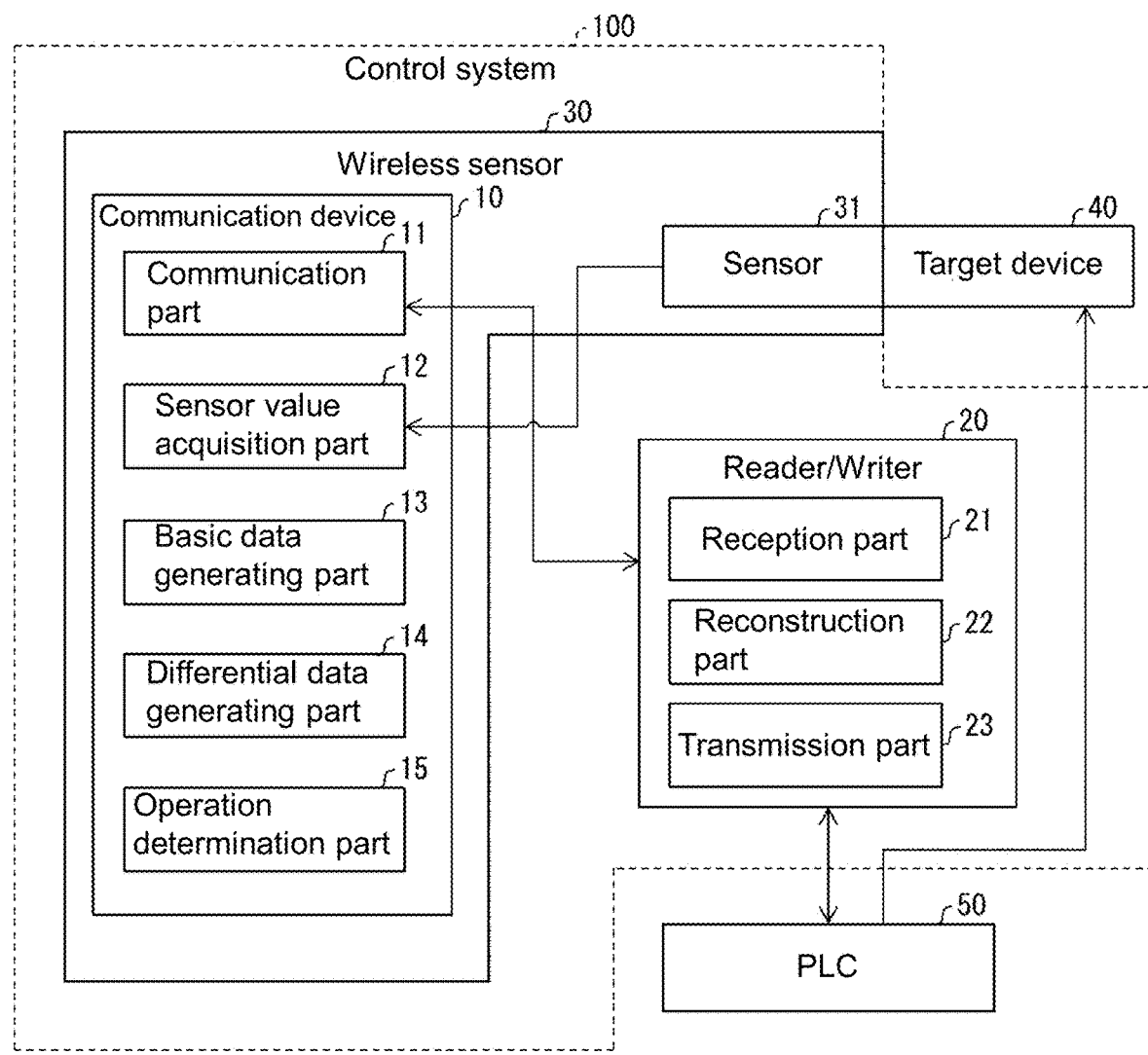
FIG. 2 is a block diagram showing a configuration of main parts of the control system.

First, an example of an aspect to which the disclosure is applied will be described with reference to FIG. 1 and FIG. 2. FIG. 1 shows an example of a schematic configuration of a control system 100 according to the present embodiment. FIG. 2 is a block diagram showing a configuration of main parts of the control system 100.

For example, as shown in FIG. 1 and FIG. 2, the control system 100 according to the present embodiment is a system configured to control a measurement target machine (hereinafter referred to as a target device 40) such as a robot and a processing machine. The control system 100 includes a wireless sensor 30 and a reader/writer 20 and communicates with a programmable logic controller (PLC) 50. The wireless sensor 30 includes one or a plurality of sensors 31 and a communication device 10.

The PLC 50 entirely controls the target device 40 and the control system 100. The wireless sensor 30 measures a predetermined physical quantity when the target device 40 operates and outputs a sensor value to the reader/writer 20 which is an external device. The sensor 31 is attached to the target device 40, and the communication device 10 acquires a sensor value of the sensor 31 and performs a predetermined process. The reader/writer 20 acquires data based on the sensor value of the sensor 31 from the communication device 10 and generates operation data related to an operation state of the target device 40.

The control system 100 is a system that collects data for detecting a sign of an abnormality or failure of the target device 40 to which the sensor 31 is attached according to the sensor value of the sensor 31. Examples of the sensor 31 include a vibration sensor configured to measure a vibration when the target device 40 operates, a temperature sensor configured to measure a temperature, and a sound sensor configured to measure a sound.

The communication device 10 acquires a sensor value measured when the target device 40 normally performs a predetermined operation from the sensor 31 attached to the target device 40 in response to a command from the reader/writer 20, generates basic data as time-series data, and provides the data to the reader/writer 20. In addition, the communication device 10 acquires the sensor value of the sensor 31 attached to the target device 40 in response to a command from the reader/writer 20 and generates measurement data as time-series data corresponding to the sensor value when the target device 40 actually operates. In addition, the communication device 10 generates differential data indicating a difference between basic data and measurement data and provides the differential data to the reader/writer 20.

In this manner, the communication device 10 provides differential data indicating a difference between basic data and measurement data to the reader/writer 20 and thus reduces an amount of data transmitted to the reader/writer 20. Therefore, it is possible to transmit data, which indicates a predetermined physical quantity when the target device 40 operates, from the communication device 10 to the reader/writer 20 through wireless communication without decreasing a resolution of data that the sensor 31 measures.

Here, the communication device 10 is not limited to a configuration used as a function unit of the control system 100, but it may have a configuration for a device that acquires a sensor value from the sensor 31 attached to the target device 40 to perform a process and transfers data to an external device for controlling the target device 40 which is a control target such as an industrial PC (IPC).

§ 2 Configuration Example

A configuration of the control system 100 according to an embodiment of the disclosure will be described below in detail with reference to FIG. 1 to FIG. 14.

Embodiment 1

Embodiment 1 of the disclosure will be described below in detail.

FIG. 1 is a diagram schematically showing a schematic configuration of the control system 100. FIG. 2 is a block diagram showing a configuration of main parts of the control system 100.

As shown in FIG. 1 and FIG. 2, the control system 100 includes the wireless sensor 30 and the reader/writer (external device) 20 and communicates with the PLC (controller) 50 via a communication network. The control system 100 is a system configured to collect data for controlling the target device 40, which is a machine to be controlled such as a robot and a processing machine. The control system 100 collects data for appropriately controlling the target device 40 with reference to the sensor value of the sensor 31 attached to the target device 40. The target device 40 is a machine that can perform a plurality of types of operations.

The wireless sensor 30 includes one or a plurality of sensors 31 and the communication device 10.

The sensor 31 is a sensor configured to measure a predetermined physical quantity when the target device 40 operates. The sensor 31 may be one or a plurality of sensors, and examples thereof may include a vibration sensor configured to detect a vibration when the target device 40 operates, a temperature sensor configured to detect a temperature when the target device 40 operates, and a sound sensor configured to detect a sound when the target device 40 operates. The sensor 31 is a wireless sensor that transmits a sensor value to the communication device 10 through wireless communication.

PLC 50

The PLC 50 controls a start and stop of operations of the target device 40. In addition, the PLC 50 instructs the reader/writer 20 to start and stop measurement of the sensor 31 attached to the target device 40. The PLC 50 detects a sign of an abnormality or failure of the target device 40 and performs drive control of the target device 40 with reference to data indicating an amount of the operation of the target device 40 provided from the reader/writer 20.

Reader/Writer 20

The reader/writer 20 includes a reception part 21, a reconstruction part 22, and a transmission part 23. The reader/writer 20 performs wireless communication with a communication device 32 through the reception part 21. In addition, the reader/writer 20 performs wired communication with the PLC 50 through the reception part 21. In addition, the reader/writer 20 receives an instruction from the PLC 50 through the reception part 21 and collects and stores data based on the sensor value of the sensor 31 attached to the target device 40 in response to the instruction from the PLC 50. As will be described below in detail, the reader/writer 20 stores basic data which is time-series data generated with reference to a sensor value measured when the target device 40 normally performs a predetermined operation for each of a plurality of types of operations of the target device 40.

The reconstruction part 22 reconstructs the sensor value of the sensor 31 based on basic data received from the communication device 10 through the reception part 21 and differential data. The reader/writer 20 transmits a sensor value reconstructed by the reconstruction part 22 by the transmission part 23 to the PLC 50 configured to control an operation of the target device 40 via a communication network.

Configuration of Communication Device 10

The communication device 10 is a device that communicates with one or a plurality of sensors 31 attached to the target device 40, acquires a sensor value of the sensor 31, and performs appropriate processing. The communication device 10 acquires a sensor value from the sensor 31 in response to a state measurement command of the target device 40 transmitted from the reader/writer 20, processes the sensor value, and transmits data based on the sensor value to the reader/writer 20 through wireless communication.

The communication device 10 includes a communication part 11, a sensor value acquisition part 12, a basic data generating part 13, a differential data generating part 14, and an operation determination part 15. The communication device 10 includes, for example, one or more processors (for example, a CPU) and one or more memories (for example, a RAM and a ROM) and is a computing device that performs functions of respective parts when the processor executes a program stored in the memory.

The communication part 11 performs wireless communication with the reader/writer 20.

The sensor value acquisition part 12 acquires a sensor value from the sensor 31. The sensor value acquisition part 12 includes an AD conversion circuit configured to convert a sensor value as an analog signal to a digital signal.

The basic data generating part 13 generates basic data as time-series data with reference to the sensor value acquired by the sensor value acquisition part 12. The basic data is time-series data generated with reference to the sensor value measured when the target device 40 normally performs a predetermined operation and is generated for each of the plurality of types of operations of the target device 40. For example, the communication device 10 executes a learning phase in which the sensor value of the sensor 31 is acquired and learned for each of the plurality of types of operations of the target device 40 when the sensor 31 is attached and set to the target device 40 and generates basic data according to a function of the basic data generating part 13.

In the learning phase, for each of a plurality of types of operations of the target device 40, the basic data generating part 13 acquires time-series data of the sensor value of the sensor 31 corresponding to the operation a plurality of times and generates basic data based on the plurality of time-series data. For example, the basic data generating part 13 may acquire time-series data of the sensor value of the sensor 31 a plurality of times and generate basic data by obtaining an average value of a plurality of times of time-series data.

Here, the learning phase is a phase in which a sensor value for each of a plurality of types of operations of a target device is acquired and the basic data is generated based on the acquired sensor value before the target device 40 actually operates. Regarding the learning phase, a phase in which measurement data is generated according to a type of an operation that the target device 40 executes when the target device 40 actually operates is defined as an operation phase.

FIG. 3(*a*) and FIG. 3(*b*) are diagrams showing examples of basic data generated by the basic data generating part 13. FIG. 3(*a*) is a graph showing a basic waveform of basic data and FIG. 3(*b*) shows an example of a data table in which basic data for each of the plurality of types of operations of the target device 40 is written. The number of samples and data obtained by digitizing waveform data for each operation of the target device 40 is included in the data table in which basic data is written. The basic data generating part 13 generates basic data shown in FIG. 3(*a*) and FIG. 3(*b*) and stores the generated basic data.

In addition, the basic data generating part 13 transmits the generated basic data (basic waveform) to the reader/writer 20 through wireless communication by the communication part 11.

The differential data generating part 14 generates differential data indicating a difference between measurement data (measurement waveform) as time-series data corresponding to the sensor value acquired by the sensor value acquisition part 12 from the sensor 31 when the target device 40 actually operates and basic data generated by the basic data generating part 13. The differential data generating part 14 transmits the generated differential data to the reader/writer 20 through wireless communication by the communication part 11.

A data length of basic data generated by the basic data generating part 13 can be, for example, a 64-bit fixed data length.

(a) of FIG. 4 is a diagram showing a basic waveform of basic data, (b) of FIG. 4 is a diagram showing a measurement waveform of measurement data, and (c) of FIG. 4 is a diagram showing differential data. As shown in (a) of FIG. 4 to (c) of FIG. 4, differential data indicating a difference between basic data and measurement data has a smaller amount of data than raw data of the basic data and the measurement data.

In this manner, the communication device 10 generates differential data indicating a difference between basic data and measurement data according to a function of the differential data generating part 14 and transmits the differential data to the reader/writer 20. Therefore, the communication device 10 can reduce an amount of data and transmit data corresponding to the sensor value of the sensor 31 to the reader/writer 20 with high efficiency. Therefore, the communication device 10 can transmit data indicating an operation state of the target device 40 to an external host device through wireless communication without decreasing a resolution of a sensor.

FIGS. 5(a) to 5(c) are diagrams showing examples of differential data that is generated by the differential data generating part 14 and transmitted to the reader/writer 20 through wireless communication by the communication part 11. As shown in FIGS. 5(a) to 5(c), a frame length of differential data generated by the differential data generating part 14 is variable and a frame length corresponding to an amount of data of a difference between basic data and measurement data is used.

In addition, the differential data generating part 14 incorporates information indicating a type of data and a data bit length into differential data. For example, the type of data can be indicated by 1 bit, with "0" as raw data, and "1" as differential data. In this manner, when the differential data generating part 14 incorporates information indicating a type of data into differential data, if a difference between basic data and measurement data is not obtained, information indicating a type of data is set as "0," and raw data of measurement data can be transmitted to the reader/writer 20.

The data bit length is information indicating a length of data (payload), for example, in 3 bits, and "000" can be used as an 8-bit length, "001" as a 16-bit length, "010" as a 24-bit length, "011" as a 32-bit length, "100" as a 40-bit length, "101" as a 48-bit length, "110" as a 56-bit length, and "111" as a 64-bit length.

In this manner, since the communication part 11 of the communication device 10 can transmit data based on the sensor value of the sensor 31 to the reader/writer 20 using an 8-bit to 64-bit variable length data frame, it is possible to transmit data to the reader/writer 20 with high efficiency.

The operation determination part 15 determines a type of an operation that the target device 40 executes. The operation determination part 15 determines a type of an operation that the target device 40 executes with reference to control information for the PLC 50 controlling the target device 40 notified of through the reader/writer 20. In addition, the operation determination part 15 may determine a type of an operation of the target device 40 with reference to measurement data corresponding to the sensor value acquired from the sensor 31.

The basic data generating part 13 and the differential data generating part 14 generate differential data using basic data corresponding to a type of an operation determined by the operation determination part 15.

Flow of Processes Performed by Control System 100

FIG. 6 is a sequence diagram showing a flow of a process performed among the PLC 50, the reader/writer 20, and the wireless sensor 30. Here, in FIG. 6, a learning phase in which basic data is generated and an operation phase in which operation data is acquired are shown as continuous operations, but the learning phase and the operation phase do not need to be continuous operations. The learning phase in which basic data is generated may be performed before the operation phase in which operation data is acquired, and, for example, may be performed when the sensor 31 is attached, may be regularly performed during maintenance of the target device 40, or may be regularly performed every time a predetermined operation time of the target device 40 elapses.

Learning Phase

In the learning phase, first, a start notification for a specific operation A of the target device 40 is transmitted from the PLC 50 to the reader/writer 20 (Step S1).

The reader/writer 20 receives a start notification for the operation A of the target device 40 transmitted from the PLC 50 (Step S2) and transmits a command to measure basic data of the operation A to the wireless sensor 30 (Step S3).

The wireless sensor 30 receives a command to measure basic data of the operation A (Step S4), starts measurement of basic data of the operation A, and acquires a sensor value from the sensor 31 that outputs the sensor value related to the operation A (Step S5). The wireless sensor 30 continuously performs acquisition of a sensor value from the sensor 31 a plurality of times until it receives a command to stop measurement of basic data of the operation A.

An end notification for the operation A of the target device 40 is transmitted from the PLC 50 to the reader/writer 20 (Step S6).

The reader/writer 20 receives the end notification for the operation A of the target device 40 transmitted from the PLC 50 (Step S7) and transmits a command to stop measurement of basic data of the operation A to the wireless sensor 30 (Step S8).

The wireless sensor 30 receives a command to stop measurement of basic data of the operation A and ends measurement of basic data of the operation A (Step S9).

The wireless sensor 30 stores basic data of the operation A and also transmits the basic data to the reader/writer 20 (Step S10).

The reader/writer 20 receives basic data of the operation A of the target device 40 and stores the basic data (Step S11).

Here, in the learning phase, in order to generate basic data for each of the plurality of types of operations of the target device 40, the PLC 50 performs the above processes of Step S1 to S11 for operations of the target device 40.

Operation Phase

In the operation phase, first, a start notification for a predetermined operation A of the target device 40 is transmitted from the PLC 50 to the reader/writer 20 (Step S21).

The reader/writer 20 receives the start notification for the operation A of the target device 40 transmitted from the PLC 50 (Step S22) and transmits a command to measure operation data of the operation A to the wireless sensor 30 (Step S23).

The wireless sensor 30 receives the command to measure operation data of the operation A (Step S24) and starts acquisition of the sensor value of the sensor 31 related to the operation A (Step S25). The wireless sensor 30 continues acquisition of a sensor value from the sensor 31 until a command to stop measurement of operation data of the operation A is received.

An end notification for the operation A of the target device 40 is transmitted from the PLC 50 to the reader/writer 20 (Step S26).

The reader/writer 20 receives the end notification for the operation A of the target device 40 transmitted from the PLC 50 (Step S27) and transmits a command to stop measurement of operation data of the operation A to the wireless sensor 30 (Step S28).

The wireless sensor 30 receives the command to stop measurement of operation data of the operation A (Step S29) and ends acquisition of the sensor value of the sensor 31 related to the operation A (Step S30).

The wireless sensor 30 generates differential data indicating a difference between measurement data corresponding to the sensor value of the sensor 31 related to the operation A acquired from the sensor 31 and basic data stored in Step S10 and transmits the differential data to the reader/writer 20 (Step S31).

The reader/writer 20 reconstructs a sensor value based on the basic data and differential data received from the wireless sensor 30 and generates operation data indicating an operation state of the target device 40 (Step S32).

The reader/writer 20 transmits the reconstructed sensor value to the PLC 50 (Step S33).

The PLC 50 receives the reconstructed sensor value (Step S34) and may determine a state of the target device 40 with reference to the sensor value.

In this manner, in the control system 100, since data transmitted and received between the wireless sensor 30 and the reader/writer 20 can be regarded as differential data and an amount of data can be reduced, communication between the wireless sensor 30 and the reader/writer 20 can be performed through wireless communication with high efficiency.

Processes Performed by Communication Device 10

FIG. 7 and FIG. 8 are flowcharts showing a flow of a process performed by the communication device 10 and showing a flow of a process of generating differential data in the operation phase.

FIG. 7 shows a flow of a process when a command to stop measurement is received from the reader/writer 20, and FIG. 8 shows a flow of a process when a command to stop measurement is not received from the reader/writer 20.

As shown in FIG. 7, when a measurement command of operation data is received from the reader/writer 20, first, the communication device 10 determines a type of an operation of the target device 40 according to a function of the operation determination part 15. The communication device 10 recognizes a type of an operation of the target device 40, reads basic data corresponding to the type of the operation stored in advance, and uses it in the following process (Step S41).

The communication device 10 resets (C=0) a counter for sampling data (Step S42).

The communication device 10 acquires a sensor value of the sensor 31 according to a function of the sensor value acquisition part 12 and converts the acquired sensor value into an absolute value (Step S43).

The communication device 10 updates (C++) the counter for sampling data (Step S44).

The communication device 10 determines whether the counter (C) for sampling data is equal to or less than the number of samples (N) of basic data (C≤N) (Step S45). When it is determined that the counter (C) for sampling data is equal to or less than the number of samples (N) of basic data, the communication device 10 advances to Step S46. When it is determined that the counter (C) for sampling data has exceeded the number of samples (N) of basic data, the communication device 10 advances to Step S47.

In Step S45, when it is determined that the counter (C) for sampling data is equal to or less than the number of samples (N) of basic data, the communication device 10 calculates differential data of the sensor value acquired in Step S43 using basic data read in Step S41 according to a function of the differential data generating part 14 and stores it in a buffer (Step S46).

In Step S45, when it is determined that the counter (C) for sampling data has exceeded the number of samples (N) of basic data, the communication device 10 stores raw data of the sensor value acquired in Step S43 in the buffer (Step S47). In this manner, when a sensor value equal to or greater than the number of samples (N) of basic data stored is sampled, the communication device 10 stores the sensor value as raw data.

Following Step S46 or Step S47, the communication device 10 determines whether a measurement stop command of operation data has been received from the reader/writer 20 (Step S48). When it is determined that a measurement stop command of operation data has been received from the reader/writer 20, the communication device 10 ends the process. When it is determined that a measurement stop command of operation data has not been received from the reader/writer 20, the communication device 10 waits for a sampling period (Step S49) and then returns to Step S43 and continues the process.

Here, the sampling period is determined by the time, and the communication device 10 acquires (samples) a sensor value during the sampling period according to a function of the sensor value acquisition part 12 and generates time-series data according to the number of sensor values (samples) sampled during the sampling period.

In this manner, the communication device 10 generates differential data indicating a difference from measurement data as time-series data corresponding to the sensor value acquired from the sensor 31 in the operation phase using basic data which is time-series data corresponding to the sensor value of the sensor 31 sampled at regular intervals in the learning phase. The communication device 10 acquires differential data for each sampling period at regular intervals until a measurement stop command of operation data is received.

When a command to stop measurement is not received from the reader/writer 20, as shown in FIG. 8, if a measurement command of operation data is received from the reader/writer 20, the communication device 10 first determines a type of an operation of the target device 40 according to a function of the operation determination part 15. The communication device 10 recognizes a type of an operation of the target device 40, reads basic data corresponding to a type of the operation stored in advance, and uses it in the following process (Step S51).

The communication device 10 resets (C=0) the counter for sampling data (Step S52).

The communication device 10 determines whether the counter (C) for sampling data is equal to or less than the number of samples (N) of basic data (C≤N) (Step S53). When it is determined that the counter (C) for sampling data is equal to or less than the number of samples (N) of basic data, the communication device 10 advances to Step S54. When it is determined that the counter (C) for sampling data has exceeded the number of samples (N) of basic data, the communication device 10 ends the process. In this manner, when it is determined that the counter (C) for sampling data has exceeded the number of samples (N) of basic data, the communication device 10 autonomously ends measurement of operation data.

The communication device 10 acquires a sensor value of the sensor 31 according to a function of the sensor value acquisition part 12 and converts the acquired sensor value into an absolute value (Step S54).

The communication device 10 updates (C++) the counter for sampling data (Step S55).

The communication device 10 calculates differential data of the sensor value acquired in Step S54 using basic data read in Step S51 according to a function of the differential data generating part 14 and stores it in a buffer (Step S56).

The communication device 10 waits for a sampling period (Step S57) and then returns to Step S53 and continues the process.

In this manner, the communication device 10 generates differential data indicating a difference from measurement data as time-series data corresponding to the sensor value acquired from the sensor 31 in the operation phase using basic data which is time-series data corresponding to the sensor value of the sensor 31 sampled at regular intervals in the learning phase. The communication device 10 generates differential data indicating a difference between basic data as time-series data and measurement data as time-series data for each sampling period according to a sampling interval of basic data and acquires the differential data.

According to such a configuration, the communication device 10 acquires a sensor value from the sensor 31 attached to the target device 40, generates basic data, stores the generated basic data, and transmits the data to the reader/writer 20. Then, when the target device 40 operates, the communication device 10 generates differential data indicating a difference between measurement data corresponding to the sensor value acquired from the sensor 31 and basic data and transmits the data to the reader/writer 20. The reader/writer 20 reconstructs the sensor value using the received differential data and basic data that is provided from the communication device 10 and stored in advance.

In this manner, when the target device 40 operates, since differential data with a smaller amount than raw data is transmitted from the communication device 10 to the reader/writer 20, data can be transmitted from the communication device 10 to the reader/writer 20 through wireless communication with high efficiency. In addition, since the communication device 10 transmits differential data to the reader/writer 20 using a variable frame, regarding data with a small amount, the data can be transmitted using a short frame, and the data can be transmitted with high efficiency.

Embodiment 2

Embodiment 2 of the disclosure will be described below. Here, for convenience of explanation, members having the same functions as the members described in Embodiment 1 are denoted with the same reference numerals and descriptions thereof will not be repeated. In addition, the configuration of the control system 100 described with reference to FIG. 1 and FIG. 2 is the same as in Embodiment 1, and description thereof will be omitted.

FIGS. 9(a) to 9(c) are diagrams showing data referred to by the communication device 10 when the target device 40 operates. FIG. 9(a) shows a measurement waveform of measurement data as time-series data corresponding to the sensor value acquired from the sensor 31 when the target device 40 operates. FIG. 9(b) is a diagram showing a basic waveform of basic data stored in advance. FIG. 9(c) is a diagram showing a difference between a measurement waveform and a basic waveform.

The communication device 10 updates basic data with reference to the sensor value generated for differential data according to a function of the basic data generating part 13. The communication device 10 acquires the sensor value of the sensor 31 when the target device 40 operates and, as shown in FIG. 9(a), generates measurement waveform data as time-series data. Then, the communication device 10 obtains a difference between the measurement waveform and a waveform of basic data as time-series data stored in advance shown in FIG. 9(b). When the difference between the measurement waveform and the basic waveform continuously deviates from a threshold value range for a certain period or longer as shown in FIG. 9(c), the communication device 10 determines that additional learning of basic data is necessary and updates and adds the basic data.

Here, when a total of differences of measurement values sampled during a predetermined sample period exceeds a certain threshold value, the communication device 10 determines that additional learning of basic data is necessary and may update or add the basic data.

The communication device 10 may overwrite basic data generated autonomously when the target device 40 operates in the basic data stored in advance and store it and thus update the basic data. In addition, the communication device 10 may add and store the basic data, which is generated autonomously when the target device 40 operates, as derived data (another pattern data) of the basic data stored in advance.

Process Performed by Communication Device 10

FIG. 10 and FIG. 11 are flowcharts showing a flow of a process in which the communication device 10 determines that additional learning of basic data is necessary and updates or adds the basic data. FIG. 10 shows a flow of a process performed by the communication device 10 that performs an update or addition when a difference between a measurement waveform and a basic waveform continuously deviates from a threshold value range for a certain period or longer. FIG. 11 shows a flow of a process performed by the communication device 10 that updates or adds basic data when a total of differences of measurement values sampled during a predetermined sample period exceeds a certain threshold value.

As shown in FIG. 10, when a measurement command of operation data is received from the reader/writer 20, the communication device 10 first determines an operation pattern of the target device 40 according to a function of the operation determination part 15. The communication device 10 recognizes the operation pattern of the target device 40, reads basic data of the operation pattern stored in advance, and uses it in the following process (Step S61).

The communication device 10 resets (C=0) the counter for sampling data exceeding a threshold value (Step S62).

The communication device 10 acquires the sensor value of the sensor 31 according to the operation pattern recognized in Step S61 according to a function of the sensor value acquisition part 12 (Step S63).

The communication device 10 stores raw data of the sensor value of the sensor 31 obtained in Step S63 in a buffer (Step S64).

In addition, the communication device 10 calculates a difference between the sensor value of the sensor 31 obtained in Step S63 and basic data and stores the calculated difference in the buffer (Step S65).

The communication device 10 determines whether the difference calculated in Step S65 has exceeded a threshold value range (Step S66). When it is determined that the difference has exceeded a threshold value range (YES in Step S66), the communication device 10 advances to Step S67. When it is determined that the difference has not exceeded a threshold value range (NO in Step S66), the communication device 10 advances to Step S69.

When it is determined that the difference has exceeded a threshold value range in Step S66, the communication device 10 updates (C++) the counter (C) for sampling data exceeding the threshold value (Step S67).

Next, the communication device 10 determines whether the counter (C) for sampling data exceeding the threshold value has exceeded a predetermined number (N) (C>N) (Step S68). When it is determined that the counter (C) for sampling data exceeding the threshold value has not exceeded a predetermined number (N) (NO in Step S68), the communication device 10 advances to Step S70. When it is determined that the counter (C) for sampling data exceeding the threshold value has exceeded a predetermined number (N) (YES in Step S68), the communication device 10 advances to Step S72.

When it is determined that the difference has not exceeded a threshold value range in Step S66, the communication device 10 resets (C=0) the counter for sampling data exceeding the threshold value (Step S69).

Following Step S68 or Step S69, the communication device 10 determines whether a measurement stop command of operation data has been received from the reader/writer 20 (Step S70). When it is determined that a measurement stop command of operation data has been received from the reader/writer 20 (YES in Step S70), the communication device 10 ends the process. When it is determined that a measurement stop command of operation data has not been received from the reader/writer 20 (NO in Step S70), the communication device 10 waits for a sampling period (Step S71) and then returns to Step S63 and continues the process.

When it is determined that the counter (C) for sampling data exceeding the threshold value in Step S68 has exceeded a predetermined number (N), the communication device 10 acquires the sensor value of the sensor 31 again according to the operation pattern recognized in Step S61 according to a function of the sensor value acquisition part 12 (Step S72).

Next, the communication device 10 stores raw data of the sensor value of the sensor 31 obtained in Step S72 in a buffer (Step S73).

The communication device 10 determines whether a measurement stop command of operation data has been received from the reader/writer 20 (Step S74). When it is determined that a measurement stop command of operation data has been received from the reader/writer 20 (YES in Step S74), the communication device 10 advances to Step S75. When it is determined that a measurement stop command of operation data has not been received from the reader/writer 20 (NO in Step S74), the communication device 10 waits for a sampling period (Step S76) and then returns to Step S72 and continues the process.

When it is determined that a measurement stop command of operation data has been received from the reader/writer 20 in Step S74, next, the communication device 10 updates or additionally stores basic data using raw data stored in the buffer in S73 as the basic data and ends the process.

In this manner, when a difference between a measurement waveform and a basic waveform continuously deviates from a threshold value range for a certain period or longer, the communication device 10 updates or adds basic data. Therefore, for example, when the measurement value changes due to aging of the sensor 31 or the like, it is possible to prevent a difference between a basic waveform and a measurement waveform from increasing. Therefore, it is possible to prevent an increase in a volume of data transmitted from the communication device 10 to the reader/writer 20, and it is possible to transmit data with high efficiency.

As shown in FIG. 11, the communication device 10 may update or add basic data when a total of differences of measurement values sampled during a predetermined sample period exceeds a certain threshold value.

When a measurement command of operation data is received from the reader/writer 20, the communication device 10 first determines an operation pattern of the target device 40 according to a function of the operation determination part 15. The communication device 10 recognizes the operation pattern of the target device 40, reads basic data of the operation pattern stored in advance, and uses it in the following process (Step S81).

The communication device 10 resets (Sum=0) a counter (Sum) with a total of differences (Step S82).

The communication device 10 acquires the sensor value of the sensor 31 according to the operation pattern recognized in Step S81 according to a function of the sensor value acquisition part 12 (Step S83).

The communication device 10 stores raw data of the sensor value of the sensor 31 obtained in Step S83 in a buffer (Step S84).

In addition, the communication device 10 calculates a difference between the sensor value of the sensor 31 obtained in Step S83 and basic data and stores the calculated difference in the buffer (Step S85).

The communication device 10 adds the difference calculated in Step S85 to the total of differences (Sum=Sum+difference) and updates the counter (Sum) with the total of differences (Step S86).

The communication device 10 determines whether the counter (Sum) with the total of differences calculated in Step S86 exceeds a threshold value (Step S87). When it is determined that the counter (Sum) with the total of differences has exceeded a threshold value (YES in Step S87), the communication device 10 advances to Step S90. When it is determined that the counter (Sum) with the total of differences has not exceeded a threshold value (NO in Step S87), the communication device 10 advances to Step S88.

When it is determined that the counter (Sum) with the total of differences has not exceeded a threshold value, the communication device 10 determines whether a measurement stop command of operation data has been received from the reader/writer 20 (Step S88). When it is determined that a measurement stop command of operation data has been received from the reader/writer 20 (YES in Step S88), the communication device 10 ends the process. When it is determined that a measurement stop command of operation data has not been received from the reader/writer 20 (NO in Step S88), the communication device 10 waits for a sampling period (Step S89) and then returns to Step S83 and continues the process.

When it is determined that a counter (Sum) with a total of differences in Step S87 has exceeded a threshold value, the communication device 10 acquires the sensor value of the sensor 31 again according to the operation pattern recognized in Step S81 according to a function of the sensor value acquisition part 12 (Step S90).

Next, the communication device 10 stores raw data of the sensor value of the sensor 31 obtained in Step S90 in a buffer (Step S91).

The communication device 10 determines whether a measurement stop command of operation data has been received from the reader/writer 20 (Step S92). When it is determined that a measurement stop command of operation data has been received from the reader/writer 20 (YES in Step S92), the communication device 10 advances to Step S93. When it is determined that a measurement stop command of operation data has not been received from the reader/writer 20 (NO in Step S92), the communication device 10 waits for a sampling period (Step S94) and then returns to Step S90 and continues the process.

When it is determined that a measurement stop command of operation data has been received from the reader/writer 20 in Step S92, next, the communication device 10 updates or additionally store basic data using raw data stored in the buffer in S91 as the basic data, and ends the process.

In this manner, when a total of differences between a measurement waveform and a basic waveform exceeds a threshold value, the communication device 10 updates or adds basic data. Therefore, for example, when the measurement value changes due to aging of the sensor 31 or the like, it is possible to prevent a difference between a basic waveform and a measurement waveform from increasing. Therefore, it is possible to prevent an increase in a volume of data transmitted from the communication device 10 to the reader/writer 20, and it is possible to transmit data with high efficiency.

Update of Basic Data

The communication device 10 autonomously updates or adds basic data stored therein when the target device 40 operates, transmits the basic data to the reader/writer 20, and needs to update basic data stored in the reader/writer 20. Since an amount of the basic data is larger than that of the differential data, the communication device 10 may divide the generated basic data into several items and transmit them to the reader/writer 20.

FIG. 12 and FIG. 13 are diagrams showing timings at which the communication device 10 autonomously performs learning and transmits the generated basic data to the reader/writer and performs an update.

As shown in FIG. 12, when control information indicating operation stop of the target device 40 is received from the PLC 50, the reader/writer 20 transmits a command to check update of basic data to the communication device 10. When a command to check update of basic data is received from the reader/writer 20, the communication device 10 divides the basic data updated or added as new basic data into several items and transmits them to the reader/writer 20. In this manner, the communication device 10 transmits the basic data updated with reference to the sensor value used for generating differential data in a period during which the operation of the target device 40 stops according to a function of the communication part 11 to the reader/writer 20.

In addition, as shown in FIG. 13, when a measurement command of operation data is received from the reader/writer 20, the communication device 10 repeats a process of generating differential data and transmitting the data to the reader/writer 20. In the process of generating differential data and transmitting the data to the reader/writer 20, according to a function of the communication part 11, the communication device 10 may divide the basic data updated with reference to the sensor value used for generating differential data and transmit the divided data to the reader/writer 20 a plurality of times in a divided manner between transmissions of differential data. Then, after all of the divided basic data is transmitted, between transmissions of differential data, the communication device 10 may transmit a basic data synchronization completion notification to the reader/writer 20.

In this manner, in a period during which the operation of the target device 40 stops, the communication device 10 transmits the basic data updated with reference to the sensor value used for generating differential data to the reader/writer 20. Therefore, it is possible to update basic data without interfering with data transmission and reception during the operation. In addition, the communication device 10 divides the basic data updated with reference to the sensor value used for generating differential data and transmits the divided data to the reader/writer 20 a plurality of times in a divided manner between transmissions of differential data. Therefore, when it is necessary to update basic data, it is possible to rapidly synchronize as much basic data as possible with the reader/writer 20 without interfering with data transmission and reception during the operation.

Embodiment 3

Embodiment 3 of the disclosure will be described below. Here, for convenience of explanation, members having the same functions as the members described in Embodiment 1 and Embodiment 2 are denoted with the same reference numerals and descriptions thereof will not be repeated. In addition, the configuration of the control system 100 described with reference to FIG. 1 and FIG. 2 is the same as in Embodiment 1, and description thereof will be omitted.

In the control system 100 of Embodiment 3, the communication device 10 has a function of correlating a basic waveform of basic data and a measurement waveform of measurement data.

FIG. 14 is a diagram schematically showing pattern matching between a basic waveform of basic data and a measurement waveform of measurement data performed by the communication device 10.

When start timings of basic data as time-series data and measurement data as time-series data are shifted, a difference between basic data and measurement data becomes larger and an amount of differential data increases. As shown in FIG. 14, the communication device 10 extracts N data samples from a data head of basic data and sets a pattern of these data samples as a basic data start pattern.

The communication device 10 performs pattern matching between the basic data start pattern and the measurement waveform pattern. The communication device 10 determines a position at which a degree of correlation between basic data and measurement data exceeds a predetermined threshold value (a difference between basic data and measurement data is within a predetermined threshold value)

according to pattern matching as a measurement waveform start position and makes start positions of basic data and measurement data coincide with each other and synchronizes data start positions to generate differential data.

In this manner, the communication device 10 sets the measurement data start position as a position at which a correlation with the basic data start pattern matches and calculates a difference between basic data and measurement data. Therefore, it is possible to synchronize basic data and measurement data to generate differential data, and it is possible to reduce a volume of differential data to transmit data to the reader/writer 20 with high efficiency.

Implementation Example According to Software

A control block (in particular, the sensor value acquisition part 12, the basic data generating part 13, the differential data generating part 14, and the operation determination part 15) of the communication device 10 may be implemented by a logic circuit (hardware) formed in an integrated circuit (IC chip) or the like or may be implemented by software.

In the latter case, the communication device 10 includes a computer that executes instructions of a program which is software for implementing functions. The computer includes, for example, one or more processors and a computer readable recording medium in which the program is stored. Then, in the computer, the processor reads and executes the program from the recording medium and thereby the functions in the embodiment of the disclosure are achieved. As the processor, for example, a central processing part (CPU) can be used. As the recording medium, in addition to a "non-temporary tangible medium," such as a read only memory (ROM), for example, a tape, a disk, a card, a semiconductor memory, a programmable logic circuit, and the like can be used. In addition, a random access memory (RAM) that loads the program and the like may be further included. In addition, the program may be supplied to the computer through an arbitrary transmission medium (a communication network, broadcast waves, etc.) that can transmit the program. Here, in an aspect of the disclosure, the program may be realized in the form of a data signal combined with carrier waves embodied according to electronic transmission.

According to the above configuration, since differential data indicating a difference between basic data as time-series data and measurement data as time-series data is generated and transmitted to the external device, it is possible to reduce an amount of data to be transmitted. Therefore, it is possible to transmit data corresponding to the sensor value with a sufficient amount of information to the external device with high efficiency even in wireless communication with a narrow communication band.

In addition, in the communication device according to the above aspect of the disclosure, the communication part may transmit the differential data to the external device using a variable length data frame.

According to the above configuration, it is possible to transmit differential data using a data frame length according to an amount of differential data, and it is possible to reduce an amount of data to be transmitted when the difference is small. In addition, when a fixed length frame is used, if the difference is large, there is a risk of data not being demodulated. However, when differential data is transmitted using a variable length data frame, even if the difference is large, there is no case in which data cannot be demodulated. Therefore, it is possible to transmit differential data to the external device with high efficiency.

In addition, in the communication device according to the above aspect of the disclosure, the basic data may be time-series data generated with reference to the sensor value measured when the machine normally performs a predetermined operation.

According to the above configuration, differential data indicating a difference between basic data as time-series data generated with reference to the sensor value measured when the measurement target machine normally performs a predetermined operation and measurement data as time-series data corresponding to the sensor value acquired from the sensor is transmitted to the external device. Therefore, since the differential data indicates a difference from the sensor value when the measurement target machine normally performs a predetermined operation, it is possible to transmit information indicating a state of the operation of the measurement target machine to the external device with high efficiency even in wireless communication with a narrow communication band with a sufficient amount of information.

In addition, in the communication device according to the above aspect of the disclosure, the basic data generating part may acquire time-series data of the sensor value of the sensor corresponding to a predetermined operation of the machine a plurality of times and generate the basic data based on a plurality of the time-series data.

According to the above configuration, since time-series data of the sensor value of the sensor is acquired a plurality of times and basic data is generated based on the plurality of time-series data, it is possible to reduce an influence of a measurement error of the sensor or the like, and it is possible to accurately generate basic data with respect to a predetermined operation of the machine. Therefore, it is possible to reduce an amount of differential data indicating a difference between basic data and measurement data and it is possible to transmit the differential data to the external device with high efficiency.

In addition, in the communication device according to the above aspect of the disclosure, the basic data generating part may generate the basic data for each of a plurality of types of operations of the machine.

According to the above configuration, since basic data is generated for each of the plurality of types of operations of the measurement target machine, it is possible to reduce an amount of differential data indicating a difference from measurement data, and it is possible to transmit the differential data to the external device with high efficiency In addition, the communication device according to the above aspect of the disclosure may include an operation determination part configured to determine a type of an operation of the measurement target machine with reference to the measurement data, and the differential data generating part may generate the differential data using the basic data corresponding to a type of the operation determined by the operation determination part.

According to the above configuration, since a type of the operation of the measurement target machine is determined, and the differential data is generated using the basic data corresponding to the determined type of the operation, it is possible to reduce an amount of differential data and it is possible to transmit the differential data to the external device with high efficiency.

In addition, in the communication device according to the above aspect of the disclosure, the basic data generating part may update the basic data with reference to the sensor value used for generating the differential data.

According to the above configuration, since the basic data is updated with reference to the sensor value, for example, when the sensor value changes due to aging degradation of the sensor, a difference between the basic data and the measurement data does not increase. Therefore, it is possible to reduce an amount of differential data and it is possible to transmit the differential data to the external device with high efficiency.

In addition, in the communication device according to the above aspect of the disclosure, the communication part may transmit the basic data updated with reference to the sensor value used for generating the differential data to the external device in a period during which the operation of the measurement target machine stops.

According to the above configuration, since the updated basic data is transmitted to the external device in the period during which the operation of the measurement target machine stops, it is possible to update the basic data without interfering with transmission of data, which corresponds to the sensor value when the measurement target machine operates, to the external device.

In addition, in the communication device according to the above aspect of the disclosure, the communication part may divide the basic data updated with reference to the sensor value used for generating the differential data and transmit the divided data to the external device a plurality of times in a divided manner between transmissions of the differential data.

According to the above configuration, since the updated basic data is divided and transmitted to the external device a plurality of times in a divided manner between transmissions of the differential data, it is possible to update the basic data without interfering with transmission of data corresponding to the sensor value to the external device, and it is possible to rapidly update the basic data.

According to the above configuration, since the differential data indicating a difference between basic data as time-series data and measurement data as time-series data is generated and transmitted to the external device, it is possible to reduce an amount of data to be transmitted. Therefore, it is possible to transmit data corresponding to the sensor value with a sufficient amount of information to the external device with high efficiency even in wireless communication with a narrow communication band.

According to the above configuration, since the external device reconstructs the sensor value based on the basic data and the differential data, it is possible to reduce a volume of data transferred between the communication device and the external device, and a sensor value for determining an operation state of the measurement target machine can be reconstructed and used in the external device.

In addition, the external device according to the above aspect of the disclosure may further include a transmission part configured to transmit the sensor value reconstructed by the reconstruction part to a controller configured to control an operation of the machine via a communication network.

According to the above configuration, since the reconstructed sensor value is transmitted to the controller configured to control the operation of the machine, it is possible to reduce a volume of data transferred between the communication device and the external device, and it is possible to transmit an accurate sensor value to the controller.

According to the above configuration, since the reconstructed sensor value is transmitted to the controller configured to control the operation of the machine, it is possible to reduce a volume of data transferred between the communication device and the external device, and it is possible to transmit an accurate sensor value to the controller.

According to the above configuration, it is possible to reduce a volume of data transferred between the communication device and the external device, and it is possible to collect information indicating a state of the operation of the measurement target machine with a sufficient amount of information even in wireless communication with a narrow communication band.

According to an aspect of the disclosure, it is possible to transmit a sensor value from a sensor to an external device with high efficiency.

The disclosure is not limited to the above embodiments, and various modifications can be made within the scope of the claims, and embodiments obtained by appropriately combining technical methods disclosed in different embodiments are included in the technical scope of the disclosure.

What is claimed is:

1. A communication device that transmits a sensor value of a sensor, which is configured to measure a predetermined physical quantity when a measurement target machine operates, to an external device external to the communication device through wireless communication, the communication device comprising a processor configured to:
   acquire the sensor value;
   generate basic data as time-series data with reference to the acquired sensor value;
   generate differential data indicating a difference between the basic data and measurement data as time-series data corresponding to the sensor value acquired from the sensor;
   transmit the differential data to the external device through wireless communication; and
   determine a type of an operation of the measurement target machine with reference to the measurement data,
   wherein the processor generates the basic data for each of a plurality of types of operations of the measurement target machine, and the processor generates the differential data using the basic data corresponding to the type of the operation,
   wherein the processor transmits the differential data with a bit length to the external device to control the target machine by the external device, wherein the bit length of the differential data is variable and is determined based on an amount of data of the differential data.

2. The communication device according to claim 1, wherein the basic data is time-series data generated with reference to the sensor value measured when the machine normally performs a predetermined operation.

3. The communication device according to claim 2, wherein the processor acquires time-series data of the sensor value of the sensor corresponding to a predetermined operation of the machine a plurality of times and generates the basic data based on a plurality of the time-series data.

4. The communication device according to claim 1, wherein the processor updates the basic data with reference to the sensor value used for generating the differential data.

5. The communication device according to claim 4, wherein the processor transmits the basic data updated with reference to the sensor value used for generating the differential data to the external device in a period during which the operation of the measurement target machine stops.

6. The communication device according to claim 4,
wherein the processor divides the basic data updated with reference to the sensor value used for generating the differential data and transmits the divided data to the external device a plurality of times in a divided manner between transmissions of the differential data.

7. A control method of a communication device that transmits a sensor value of a sensor configured to measure a predetermined physical quantity when a measurement target machine operates to an external device external to the communication device through wireless communication, the control method comprising:
a learning phase in which the sensor value is acquired and basic data as time-series data is generated by learning and referring to the sensor value, and the basic data is transmitted to the external device through wireless communication; and
an operation phase in which differential data indicating a difference between the basic data and measurement data as time-series data corresponding to the sensor value acquired when the measurement target machine operates from the sensor is generated, and the differential data is transmitted to the external device through wireless communication,
wherein a type of an operation of the measurement target machine is determined with reference to the measurement data, the basic data are generated for each of a plurality of types of operations of the measurement target machine, and the differential data are generated using the basic data corresponding to the type of the operation,
wherein the differential data with a bit length to the external device is transmitted to the external device to control the target machine by the external device, wherein the bit length of the differential data is variable and is determined based on an amount of data of the differential data.

8. An external device comprising:
a reception circuit configured to receive the basic data and the differential data from the communication device according to claim 1; and
a reconstruction circuit configured to reconstruct the sensor value based on the basic data and the differential data.

9. The external device according to claim 8, further comprising
a transmission circuit configured to transmit the sensor value reconstructed by the reconstruction circuit to a controller configured to control an operation of the machine via a communication network.

10. A control method of an external device comprising:
receiving the basic data from the communication device according to claim 1; and
receiving the differential data and reconstructing the sensor value based on the basic data and the differential data.

11. A control system comprising the communication device according to claim 1 and an external device,
the external device comprises:
a reception circuit configured to receive the basic data and the differential data from the communication device; and
a reconstruction circuit configured to reconstruct the sensor value based on the basic data and the differential data.

12. The communication device according to claim 1,
wherein the basic data is time-series data generated with reference to the sensor value measured when the machine normally performs a predetermined operation.

13. The communication device according to claim 1,
wherein the processor generates the basic data for each of a plurality of types of operations of the machine.

14. The communication device according to claim 2,
wherein the processor generates the basic data for each of a plurality of types of operations of the machine.

15. The communication device according to claim 1,
wherein the processor updates the basic data with reference to the sensor value used for generating the differential data.

16. The communication device according to claim 2,
wherein the processor updates the basic data with reference to the sensor value used for generating the differential data.

17. The communication device according to claim 3,
wherein the processor updates the basic data with reference to the sensor value used for generating the differential data.

18. The communication device according to claim 1,
wherein the processor transmits the differential data to the external device by transmitting a data frame to the external device, wherein the data frame information indicating the bit length of the differential data and information indicating the differential data.

* * * * *